United States Patent [19]

Caswell

[11] Patent Number: 4,763,128
[45] Date of Patent: Aug. 9, 1988

[54] ELECTRONIC COUNTERMEASURE TECHNIQUE

[75] Inventor: Robert L. Caswell, Placentia, Calif.

[73] Assignee: Rockwell International Corporation, El Segundo, Calif.

[21] Appl. No.: 703,234

[22] Filed: Jan. 31, 1968

[51] Int. Cl.⁴ .............................................. G01S 7/38
[52] U.S. Cl. .................................................... 342/14
[58] Field of Search ............. 343/9, 18, 101; 342/13, 342/14

[56] References Cited

U.S. PATENT DOCUMENTS

| 3,045,232 | 7/1962 | Mercer et al. | 343/9 X |
| 3,167,762 | 1/1965 | Vosburgh et al. | 343/9 |
| 3,270,341 | 8/1966 | Sirons | 343/9 |
| 4,646,098 | 2/1987 | Mattern et al. | 342/14 |

Primary Examiner—T. H. Tubbesing
Attorney, Agent, or Firm—H. Fredrick Hamann; George A. Montanye; James F. Kirk

[57] ABSTRACT

Electronic countermeasure technique for protecting low-flying aircraft from radiant energy guided missiles by bouncing a decoy guidance signal off the ground near the aircraft.

4 Claims, 1 Drawing Sheet

U.S. Patent   Aug. 9, 1988   4,763,128
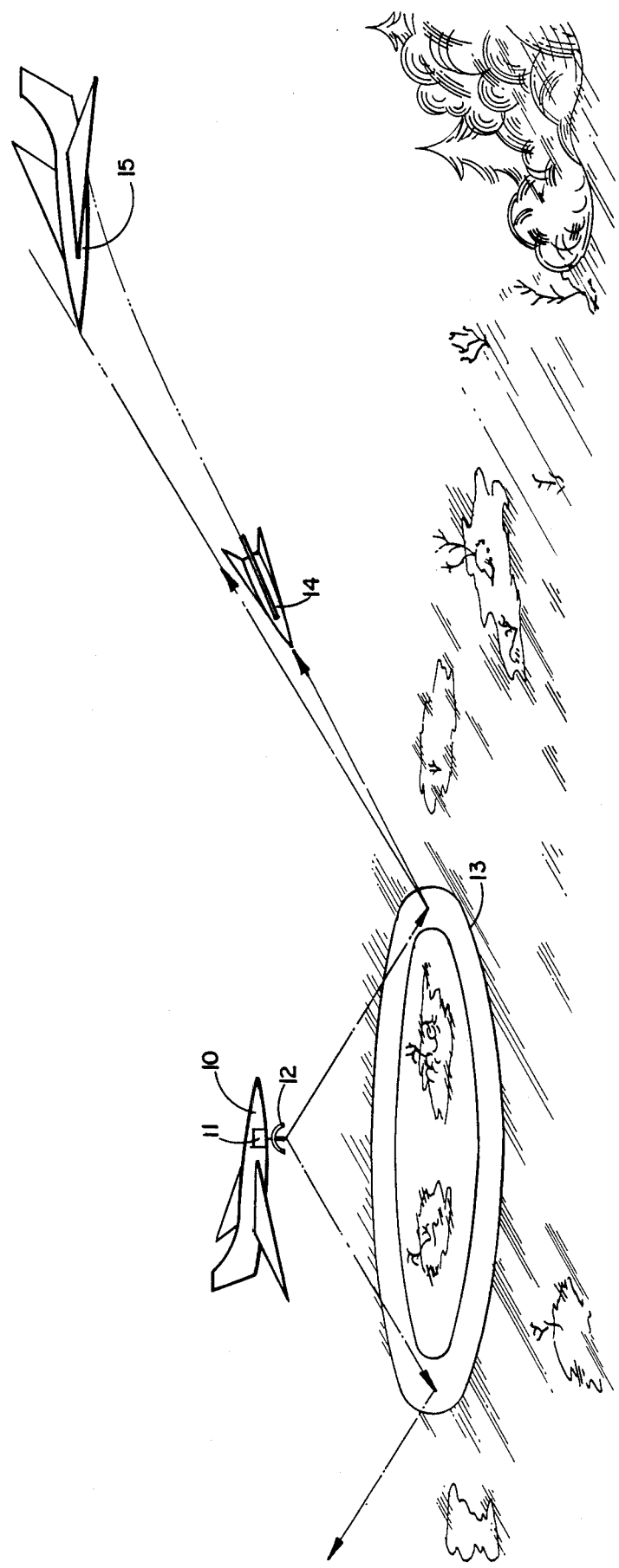

ELECTRONIC COUNTERMEASURE TECHNIQUE

CROSS REFERENCES TO RELATED APPLICATIONS

U.S. Pat. No. 3,646,559 issued 2/29/72 to C. A. Wiley for Phase and Frequency Scanned Antenna.

BACKGROUND OF THE INVENTION

The military application of aircraft to penetration missions, wherein a hostile territory is penetrated either for reconnaisance or weapon delivery purposes, has required that such aircraft fly a low-altitude flight path, maneuvering as necessary to avoid terrain obstacles. In this way, the penetrating vehicle is able to utilize such terrain for virtual and actual masking of the vehicle from detection by hostile ground-based radars, as described more fully in U.S. Pat. No. 3,360,794 issued Dec. 26, 1967, to C. E. Anderson, et al, for Terrain Avoidance System and also in U.S. Pat. No. 3,293,641 issued Dec. 20, 1966, to D. E. Bennett, et al, for Lateral Maneuver Indicator. Although such techniques tend to mask the penetrating vehicles from ground-based radars, such vehicles may yet be exposed to airborne detection systems onboard hostile interceptor aircraft. Such hostile systems may include doppler processing to distinquish a low-flying detected target from amid the clutter background against which the target is detected. Such doppler-processing may also be done by target tracking systems entirely contained within an air-to-air guided missile launched from the hostile vehicle, the vehicle's radar merely performing the function of illuminating the target or penetrating aircraft, as discussed more fully in U.S. Pat. No. 3,646,559 issued 02/29/72 for A Phase and Frequency Scanned Antenna by Carl A. Wiley, assignor to North American Rockwell Corporation, assignee of the subject invention.

SUMMARY OF THE INVENTION

By means of the concept of the subject invention, there is provided an electronic countermeasure technique for protecting low flying aircraft from radar-guided missiles by bounding a decoy guidance signal off the ground near the aircraft so as to provide an energy pattern azimuthally enclosing the aircraft.

Such concept may be better appreciated from the following description, taken together with the accompanying single drawing in which:

BRIEF DESCRIPTION OF THE DRAWING

The single FIGURE represents a low-flying aircraft employing the inventive concept.

DESCRIPTION OF THE PREFERRED EMBODIMENT

Referring now to the single FIGURE, there is illustrated a low-flying aircraft 10, aboard which there is installed a radiant energy transmitting system 11, such as a radar system and including an antenna 12 mounted on an underside of the aircraft and oriented substantially in a down-ward looking direction. The antenna aperture is preselectively shaped to provide an annular conical far-field pattern, whereby an annular or ringlike terrestial area 13 (under the aircraft 10) is illuminated by such system.

The angle of such cone is preselected to result in a reflected radiation pattern from the terrestial area 13 which, at those low altitudes safely employed by the aircraft 10, azimuthally encloses the aircraft 10 as to provide a shield of reflected energy. Such shield resembles a cone, having a down-ward apex, but truncated at the ground, with ring 13 representing that portion of maximum energy level. Such reflected energy will display a doppler shift very near to that which would occur over a direct path from the protected aircraft 10 to a radar-guided missile 14. Accordingly, a radar-guided missile 14 (launched from an airborne hostile aircraft 15) would tend to track the ghost target provided by such reflected energy, with a trajectory terminating in the ground at area 13.

The signal strength of the described protective cone of reflected energy would tend to be greater than that of an omni-directional antenna, due to the concentration of energy into an annular ring pattern. Also, during a terminal guidance phase of missile 14, the such reflected path length of that portion of the energy received or utilized by a guided missile 14 from transmitter 11 is less by far than that for energy transmitted by a hostile "mother" vehicle 15 to and diffusely reflected from the target vehicle 10, with only a portion being reflected toward missile 14. Such shorter path length tends to compensate for the use of a directional transmitting by the hostile vehicle, as to allow system 11 to provide an energy sheath of adequate signal strength using ordinary transmitter power levels.

Even if, however, a tracking missile should be launched at the low flying vehicle from a line-of-sight position above the vehicle and inside the protective cone, a useful counter measure function may yet be provided. The simultaneous presence of a portion of the energy cone and the target vehicle within the seeker missile's receiver beamwidth results in a combined radar target having a centroid tending to be displaced from the target of interest, the tracking of which displaced centroid or "ghost" target by the guided missile yet resulting in its missing the target of interest.

The low-flying aircraft 10 need not continuously operate the electronic counter measure (ECM) system 11 for generating such ghost antenna pattern, as to possibly alert hostile systems to its presence in an area. Instead, such ECM system may be operated only during the detection of a hostile interrogation signal, by a passive omni-directional receiver system installed on the vehicle 10 for such purpose. A device combining such reception for affecting such beacon function may be constructed and arranged in accordance with the concepts disclosed in U.S. Pat. No. 3,039,089 issued June 12, 1962, to A. W. McMurtrey, Jr. for a Radar System.

Further, although the concept of the invention has been described in terms of the reflected energy completely azimuthally enclosing the utilizing vehicle, the concept of the invention is not so limited. For example, where, due to a relatively slower speed of certain classes of missiles, relative to a vehicle to be intercepted, attack from the rear of such vehicle is precluded, the reflected pattern provided by the vehicle's antenna 12 need not be enclosed to the rear of the vehicle.

Accordingly, there has been described an improved electronic counter measure system for protection of low-flying aircraft from radar-guided missiles.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electronic counter measure technique for protection of a low-flying aircraft from radiant energy-guided missiles comprising the step of generating an upwardly reflected, non-scanning, substantially annular conical energy pattern which at least partially azimuthally encloses said aircraft.

2. An electronic counter measure technique for protection of a low-flying aircraft for radiant energy guided missiles comprising the step of bouncing a non-scanning radiant energy beam, having a substantially annular conical pattern, off terrain under said aircraft whereby said bounced pattern at least partially azimuthally encloses said aircraft.

3. An electronic counter measure technique for protection of a low-flying aircraft from radiant energy guided missiles comprising the steps of
bouncing a non-scanning radiant energy beam, having a substantially annular conical pattern, off the terrain under said aircraft; and
maintaining said aircraft at an altitude at which said bounced pattern at least partially azimuthally encloses said aircraft.

4. An electronic counter measure system for use on a low-flying aircraft and including a downward-looking non-scanning transmitting antenna having a substantially annular conical radiating pattern.

* * * * *